Oct. 24, 1950 R. GREAVES 2,527,411
SUSPENSION MEANS BETWEEN A SUPPORTING WHEEL
AND THE CHASSIS-FRAME OF A VEHICLE
Filed Feb. 18, 1948 2 Sheets-Sheet 1
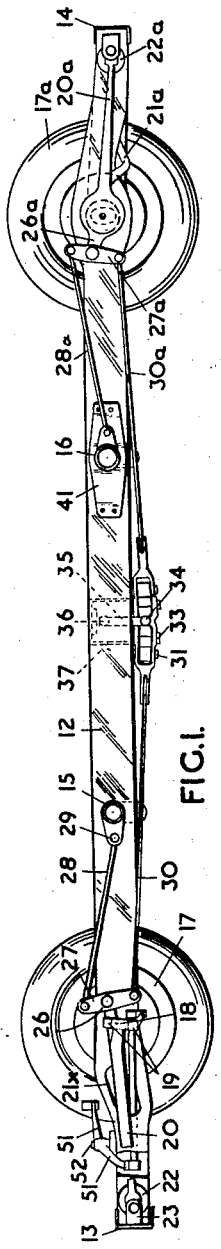
INVENTOR.
RAYMOND GREAVES
BY Mawhinney & Mawhinney
ATTORNEYS.

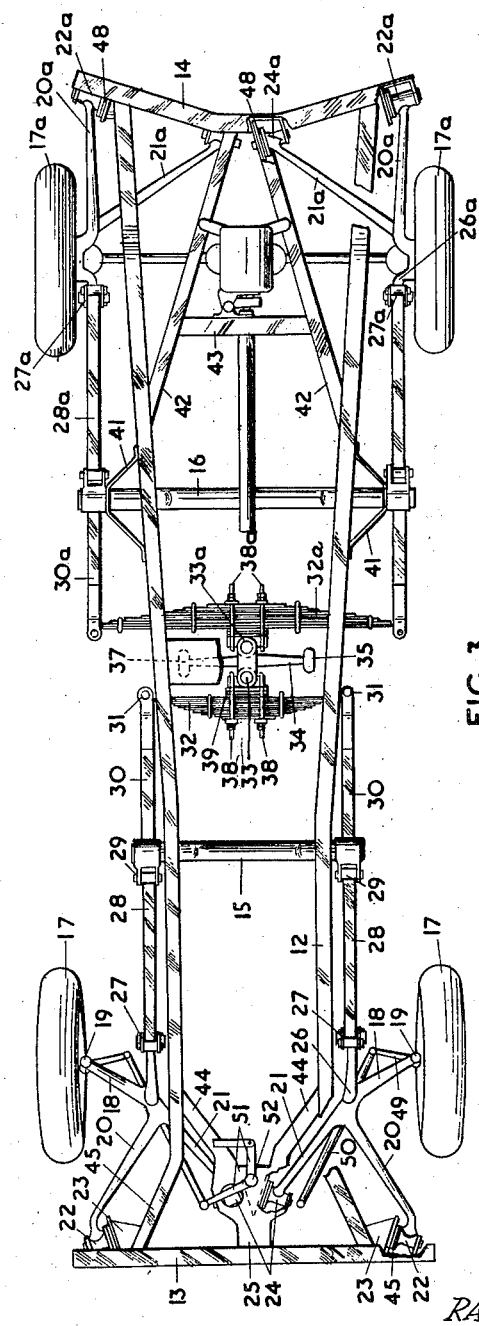

Patented Oct. 24, 1950

2,527,411

UNITED STATES PATENT OFFICE 2,527,411

SUSPENSION MEANS BETWEEN A SUPPORTING WHEEL AND THE CHASSIS-FRAME OF A VEHICLE

Raymond Greaves, Scarborough, England

Application February 18, 1948, Serial No. 9,190
In Great Britain November 30, 1945

Section 1, Public Law 690, August 8, 1946
Patent expires November 30, 1965

10 Claims. (Cl. 280—124)

1

This invention relates to a suspension means between a supporting wheel and the chassis-frame (and this latter term is used herein to include those cases in which the body constitutes or provides the chassis-frame) of a motor-car or other vehicle.

My main object is to provide an improved suspension incorporating desirable features of the suspensions disclosed in the specification of my U. S. application Serial No. 595,632 filed May 24, 1945, on which U. S. Patent No. 2,445,219 issued July 13, 1948.

According to the invention, a suspension means includes a rigid member (hereinafter referred to as the shackle for convenience), upon which a pre-stressed means acts, connected at spaced points to a link and an arm, the link being connected to the chassis-frame and the arm being rigidly connected to the wheel hub assembly and pivoted on the chassis-frame, on the side of the wheel hub shackle remote from that where the link is connected to the chassis-frame, for movement about an axis which need not be horizontal and is at less than a right angle (for example, 45° or preferably about 70°), to the longitudinal center line of the vehicle; and the parts are arranged so that the pre-stressed means will become progressively further stressed, to an increasing extent, as the chassis-frame falls relatively to the wheel, the resilient means being stressed (but to a minimum) when the wheel is suspended freely (i. e., when the chassis-frame is jacked to lift the wheel), in which conditions the link, the arm, and the line of thrust of the resilient means are preferably substantially horizontal. When the axis of the pivotal connection of the said arm to the chassis-frame is nearly at right angles to the longitudinal center line a spring-loaded damper may be required.

As regards the front suspension means, the said arm may have four integral limbs, one pivoted to the shackle, one fast with the hub assembly, and the other two forming a pivotally-mounted wish-bone. The arrangement may be such that the shackle, in front elevation, is between the two pivotal supports of the wish-bone.

In the case of the rear suspension means, the said arm may have two wish-bone limbs united to one another near where the arm is rigidly connected to the hub assembly, and the shackle, in rear elevation, may be behind the outer of the two pivotal supports for the wish-bone.

In the accompanying drawings:

Figure 1 is a side elevation of a chassis-frame (a small portion of which is broken away at the front) suspended according to the invention;

Figure 2 is a diagram (being a side elevation) showing, to a larger scale, the front end in the pre-stressed inextensible free-of-load condition;

Figure 3 is a plan with portions of the chassis-frame broken away at both the front and the rear; and Figures 4 and 5 are diagrams similar to that of Figure 2 but showing two modifications.

In the construction shown by Figures 1 to 3, the chassis-frame comprises two longitudinals 12, 12 which are braced at the front end by a frame-member 13 and at the rear end by a frame-member 14, whilst between their ends they are braced by frame-members 15, 16.

Each of the front wheels 17 has its hub assembly steerably hinged for movement on the limb 18 of the associated swinging arm, the limb extending between the bracket parts 19, 19 of the hub assembly which are steerably connected with the limb by a king pin in the usual manner.

The forward part of each swinging arm is formed as a wish-bone with limbs 20, 21, the former being pivotally mounted at 22 in a bracket 23 and the latter at 24 in a bracket 25, both the brackets being fast with the front cross-member 13. The limb 21 extends through a clearance opening 21x in the adjacent longitudinal 12. The hinge point 22 is substantially straight ahead of the king pin, and it will be observed that the pivotal axis is inclined (in plan) at approximately 70° to the longitudinal center-line of the vehicle.

In addition, each swinging arm has the junction point of the three limbs 18, 20 and 21 rigidly connected to a limb 26 which extends slightly upwardly and which is hinged to the mid-point of a shackle 27. The upper end of the shackle is hinged to a link 28 pivotally mounted at 29 upon a bracket carried by the end of the frame-member 15.

The lower end of each shackle is acted upon by a pre-stressed means, which may be a mechanical spring, or of rubber, or, for example, a pneumatic device—as disclosed in Patent No. 2,445,219 aforesaid. In the arrangement here shown the lower end of each shackle 27 is pivotally connected to a link 30 hinged at 31 to the adjacent end of a transverse leaf spring 32 which serves also for tensioning the corresponding link 30 on the other side. All the links 28 and 30 are, it will be observed, formed as flat strips.

The transverse spring 32 is shown as being hinged for movement about a vertical pivot 33 rotatably carried by a bar 34, the ends of the bar being suspended by links 35 hinged at 36, for movement about a horizontal axis, to a frame-member 37 interconnecting the two chassis longitudinals at their centre. For assembly purposes the chassis-frame may be lifted and the spring forcibly drawn into position by nuts on the long U-bolts 38. Removable plates 39 are provided for adjustment purposes.

The suspension for the rear wheels 17a,17a is arranged in a substantially similar manner to that of the front suspension, the same reference numerals, followed by the suffix a, being applied to the like parts. The suspension for each wheel includes a shackle 27a, upper and lower links 28a, 30a and a transverse leaf spring 32a mounted for movement about a vertical pivot 33a rotatably supported by the bar 34. The swinging arm for each rear wheel is of slightly different shape, as will be seen from the drawings, the limb 20a running fore-and-aft so as to be connected directly to the hub assembly of the associated wheel and having a forwardly-extending limb 26a connected to the centre of the shackle 27a. The other limb 21a of the wish-bone passes beneath the adjacent chassis longitudinal, as shown by Figure 1. The pivotal points for each rear wishbone are marked 22a and 24a, and it will be observed that the angle of inclination of the pivotal axis (in plan view) to the longitudinal center-line of the chasis is approximately 70°.

It will also be observed that the outer ends of the frame-member 16 are further supported from the adjacent longitudinals 12 by means of brackets 41. Furthermore, the pivotal points 24a are respectively braced by members 42 to the adjacent chassis longitudinals 12, the bracing members being in turn interconnected by a cross-member 43. In like manner the bracket 25 at the front end, supporting the pivotal points 24, has frame-members 44 extending to the adjacent chassis longitudinals. The forward extremities of the latter are out-turned, as shown at 45, so as to meet the cross-member 13 in the vicinity of the brackets 23.

In the diagram of Figure 2 it is assumed that the chassis has been jacked up to leave the front wheel freely suspended. In this condition the spring 32, although pre-stressed, is stressed to a minimum, the links 28 and 30 being substantially horizontal, as is also the center-line of the swinging arm, the center-line being indicated by the dotted line 47. In all other suspension conditions the spring 32 will be stressed to a greater extent. Figure 1 shows the parts in a good average load position.

The pivotal mountings for the wish-bone limbs may incorporate appropriate friction and thrust washers, shown at 48, serving to take the end load due to the pull of the resilient means and to introduce a requisite damping. But it is essential that the swinging arms have practically full freedom of movement (the system is self-damping) so that they tend to balance each other and spread the load. Quite a small fraction of the damping employed on orthodox suspensions maintains a level-ride on rough roads and like surfaces.

For assembly purposes the chassis-frame may be lifted and the springs forcibly drawn into position by nuts on the long U-bolts 38 and 38a. Removable plates 39 are provided for tension adjustment purposes. When roll is satisfactorily eliminated the U-bolts are finally secured and locked.

As an alternative the link 28 can obviously be connected to the lower end of the shackle 27x in place of the link 30, as shown at 28x in Figure 4, and the link 30 connected to the upper end of the shackle, as shown at 30x in Figure 4, 12x being the adjacent chassis longitudinal.

In another alternative, as shown by Figure 5, the swinging arm 60 is hinged between its ends to the lower end of the shackle 27y and is pivoted at 61 to the chassis-frame 12y on that side of the shackle on which the spring means acts in tension, the spring means, arranged as disclosed by Figures 1 and 2, acting on the upper end of the shackle by means of a link 30y passing through an opening 62 in the adjacent longitudinal 12y to reach the adjacent end of the spring. The other end 63 of the swing arm is fast with the wheel hub assembly on that side of the shackle on which the link 28y is arranged, the link being hinged to the mid-point of the shackle, and to the chassis-frame at 29y.

The drawings show the lower bracket part 19 as fast with an arm 49 linked by an inclined track rod portion 50 to one arm of a bell-crank 51 mounted for vertical pivotal movement at 52, the pivotal axis thereof lying substantially at the intersection of the axes through the pairs of pivotal mountings 22, 24. But, whilst retaining the aforesaid preferred steering rod end positions, the angle of the arms 49 and 51 in relation to the rod 50 may (when the wheels are steering straight ahead) obviously vary with different designs.

By this means I provide a safe and comfortable suspension which will be substantially free from roll, pitch and wheel bounce in different load, speed and surface conditions, without recourse to roll stabilizers, manual controls or helper springs.

Moreover, the usual shock absorbers or dampers may be discarded, as in all service conditions the friction and thrust washers provide the requisite damping.

What I claim as my invention and desire to secure by Letters Patent of the United States is:

1. A suspension means, between a supporting wheel and a vehicle chassis-frame, including a shackle, pre-stressed means reacting between one end of said shackle and said chassis-frame, a link interconnecting another point of said shackle and said chassis-frame, an arm pivotally interconnecting yet another point of said shackle and said chassis-frame, said link and said arm extending, at least mainly, in opposite directions from said shackle, and the pivotal connection of said arm to said chassis-frame enabling the arm to move about an axis which is at less than a rightangle with respect to the longitudinal center-line of the vehicle, and a wheel hub assembly fast with said arm, the parts being arranged so that the pre-stressed means will be least stressed when the wheel is suspended freely, in which latter conditions the link, the arm, and the line of action of the pre-stressed means are substantially horizontal, and so that the pre-stressed means will become progressively further stressed as the chassis-frame falls relatively to the wheel.

2. A front suspension means, between a supporting front wheel and a vehicle chassis-frame, including a shackle, pre-stressed means reacting between one end of said shackle and said chassis-frame, a link interconnecting another point of said shackle and said chassis-frame, an arm having four integral limbs, a pivotal connection between one of said limbs and yet another point of said shackle, aligned pivotal connections between two others of said limbs and said chassis-frame to form a wish-bone, said link and said arm extending in opposite directions from said shackle, and said aligned pivotal connections enabling the wish-bone to move about an axis which is at less than a rightangle with respect to the longitudinal center-line of the vehicle, and a wheel hub assembly fast with the fourth said limb, the parts being arranged so that the pre-stressed means will be least stressed when the wheel is suspended freely, in which latter conditions the link, the arm, and the line of action of the pre-stressed means are substantially horizontal, and so that the pre-stressed means will become progressively further stressed as the chassis-frame falls relatively to the wheel.

3. A front suspension means, according to claim 2, in which, in front-elevation, the shackle is between the two pivotal connections to the chassis-frame of those two limbs of said arm which form the wish-bone.

4. A rear suspension means, between a supporting rear wheel and a vehicle chassis-frame, including a shackle, pre-stressed means reacting between one end of said shackle and said chassis-frame, a link interconnecting another point of said shackle and said chassis-frame, an arm having three integral limbs, a pivotal connection between one of said limbs and yet another point of said shackle, aligned pivotal connections between the other two said limbs and said chassis-frame to form a wish-bone, said link and said arm extending in opposite directions from said shackle, and said aligned pivotal connections enabling the wish-bone to move about an axis which is at less than a rightangle with respect to the longitudinal center-line of the vehicle, and a wheel hub assembly fast with said arm at the junction of said limbs, the parts being arranged so that the pre-stressed means will be least stressed when the wheel is suspended freely, in which latter conditions the link, the arm, and the line of action of the pre-stressed means are substantially horizontal, and so that the pre-stressed means will become progressively further stressed as the chassis-frame falls relatively to the wheel.

5. A rear suspension means, according to claim 4, in which, in rear elevation, the shackle is aligned behind the outer of the two pivotal supports for the wish-bone.

6. A suspension means, according to claim 1, in which damping means is incorporated in at least one pivotal connection between said arm and said chassis-frame.

7. A front suspension means, between each of a pair of supporting front wheels and a vehicle chassis-frame, including a shackle, pre-stressed means reacting between one end of said shackle and said chassis-frame, a link interconnecting another point of said shackle and said chassis-frame, an arm having four integral limbs, a pivotal connection between one of said limbs and yet another point of said shackle, aligned pivotal connections between two other of said limbs and said chassis-frame to form a wish-bone, said link and said arm extending in opposite directions from said shackle, and said aligned pivotal connections enabling the wish-bone to move about a rearwardly-directed axis which makes an angle of between 45° and 70° with respect to the longitudinal center-line of the vehicle, and a wheel hub assembly fast with the fourth said limb, the said rearwardly-directed axes for the wish-bones of both front wheels intercepting each other on the said longitudinal center-line, and the parts being arranged so that the pre-stressed means will be least stressed when the wheel is suspended freely, in which latter conditions the link, the arm, and the line of action of the pre-stressed means are substantially horizontal, and so that the pre-stressed means will become progressively further stressed as the chassis-frame falls relatively to the wheel.

8. A front suspension means, according to claim 7, in which the sprung end pivot of a drag link, for communicating steering movement from a steering wheel of the vehicle to the said supporting front wheels, is pivoted on an axis which passes through the said point of interception of the two wish-bone axes.

9. A suspension means, between a supporting wheel and a vehicle chassis-frame, including a shackle, pre-stressed means reacting between one end of said shackle and said chassis-frame, a link interconnecting another point of said shackle and said chassis-frame, an arm pivotally connected, at a point which is spaced from one end thereof, to yet another point of said shackle and, at the other end, pivoted to said chassis-frame, said arm extending mainly from said shackle in the opposite direction to said link but with the said one end of said arm projecting across said shackle, and the said pivotal connection of said arm to said chassis-frame enabling said arm to move about an axis which is at less than a rightangle with respect to the longitudinal center-line of the vehicle, and a wheel hub assembly fast with the said projecting end of said arm, the parts being arranged so that the pre-stressed means will be least stressed when the wheel is suspended freely, in which latter conditions the link, the arm, and the line of action of the pre-stressed means are substantially horizontal, and so that the pre-stressed means will become progressively further stressed as the chassis-frame falls relatively to the wheel.

10. A suspension means, according to claim 1, in which the angle included between the axis of the pivotal connection of said arm to said chassis-frame and the longitudinal axis of the latter is from 45° to 70°.

RAYMOND GREAVES.

No references cited.